Dec. 26, 1944.  D. M. McBEAN  2,365,890
METHOD OF FOOD DEHYDRATION
Filed Oct. 5, 1942
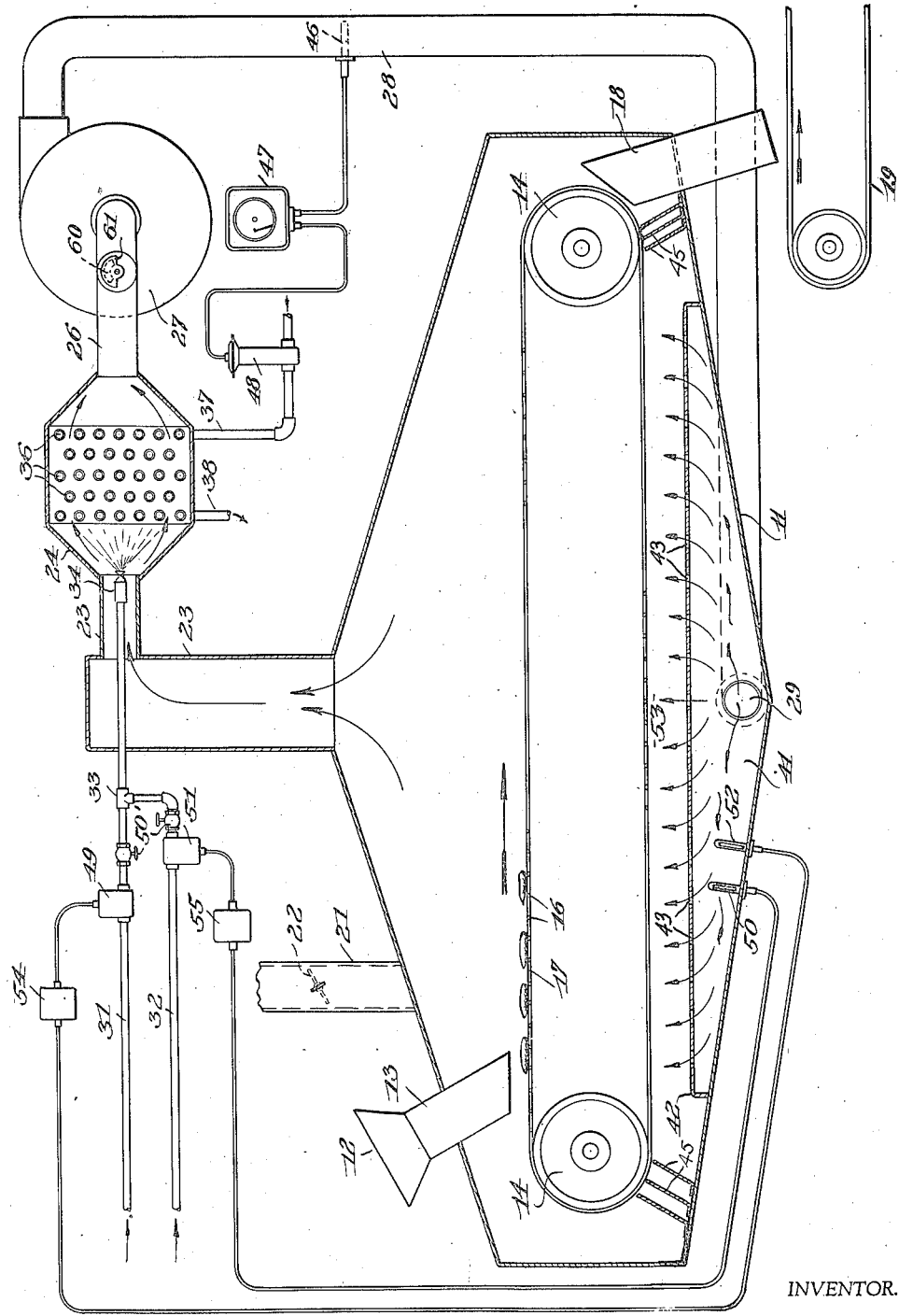
INVENTOR.
Douglas M. McBean
BY
Nicolas E. Thomsen
his Attorney Patented Dec. 26, 1944

2,365,890

UNITED STATES PATENT OFFICE 2,365,890

METHOD OF FOOD DEHYDRATION

Douglas M. McBean, Rochester, N. Y.

Application October 5, 1942, Serial No. 460,917

1 Claim. (Cl. 34—15)

My invention relates to a method for food dehydration.

An object of my invention is to provide an improved system of food dehydration adapted to reduce the dehydrating time and adapted to reduce the bulk of and the floor space for equipment required in the conventional food dehydration process.

Another object of my invention is to introduce into the food dehydration process, a pre-drying step which very rapidly extracts a large proportion of the moisture from the food being dehydrated to the end that the conventional dehydrator will have considerably less moisture to extract from the food and so that considerably less bulk of food product need be handled in the dehydrator.

My invention further contemplates a novel process of pre-drying food products and an efficient apparatus adapted to carry out said pre-drying step to the end that the productive capacity of the conventional dehydration plant may be materially increased.

Other objects and advantages of my invention will be apparent from the following description, when taken in connection with the accompanying drawing, in which:

The figure is a view, largely diagrammatic, showing an apparatus suitable for carrying out my novel pre-drying process.

In the conventional dehydration process the edibles being dehydrated, after being washed, are first sliced, diced or otherwise somewhat comminuted and then blanched to inactivate the enzymes. After the blanching step has been completed the edibles are dehydrated substantially to dryness. In a dehydration plant where any considerable volume of food is being handled not only is the equipment employed bulky, necessitating a large amount of floor space, but also the time required for complete dehydration is extensive. I have found that the time required for dehydration may be materially reduced and that the size of the equipment and the floor space occupied thereby may be materially reduced by subjecting the food product being dehydrated to my novel pre-drying step.

The pre-drying step of my invention I have found is capable of rapidly reducing the moisture content from one-half to one-third of its original value by weight and to result in a reduction in weight of the material being dehydrated to approximately half its original weight. Moreover, by subjecting the pre-dried product to a pressing operation the bulk thereof may be materially reduced. The result is that if my pre-drying process is employed in a dehydration plant which is now in operation, the capacity of the plant may be doubled or even possibly tripled. In new plants there will be a considerable saving in the amount of materials required for building the dehydrator and a considerable saving in floor space for the same productive out-put.

Referring to the drawing, 11 is a shell or large compartment which may be made of light sheet metal, preferably insulated, and which may be of any suitable size and shape, depending upon the capacity of the dehydration plant in which it is to be employed. The food product such as vegetables, fruit, meat or fish to be preliminarily dehydrated or pre-dried, after being blanched, is fed in any suitable manner to a hopper 12, the chute 13 of which extends into the compartment or chamber 11.

Mounted in the chamber 11 and driven in any suitable manner are sprockets 14 which are adapted to drive a conveyer 16. The conveyer may be a metal chain of appreciable width upon which the edibles from the chute 13 drop so as to be conveyed through the chamber. While a conveyer made up of metal links is desirable, other types of conveyers may be used. A chain conveyer or a conveyer made up of metal links has the advantage of maximum strength while enabling a maximum number of openings 17 between the links of the chain. The chain should be of fine enough mesh so that the edibles, in their sliced or diced condition, do not drop through the interstices in the conveyer.

The conveyer carries the food product through the chamber and discharges it through a discharge chute 18. The edibles at this point may be picked up by a conveyer 19 driven in any suitable manner to be carried to the conventional dehydrator. However, if desired the coneveyer 19 may carry the food product to a press or other means of compressing the food product so as to still further reduce its bulk before being transferred to the conventional dehydrator. Preferably the conveyer is driven by a variable speed prime mover (not shown) so that the pre-drying time may be accurately controlled and regulated. Moreover, while I have shown an open mesh conveyer, it would be possible, with some resulting disadvantages, to employ a stationary screen for the reception of the edibles.

The chamber 11 is provided with a vent or outlet 21 which may be controlled by a valve or damper 22 for the purpose of regulating the pressure in the chamber 11. As will presently appear, it is not essential in my pre-dryer to maintain any substantial pressure therein. A pressure only slightly above atmosphere is desirable. It is, therefore, not necessary that the chamber 11 be airtight and leakage therefrom may occur at the charging chute 13 or the discharging chute 18. However, the valve 22 does permit some slight regulation of the pressure within the chamber so as to enable pressures to be maintained therein slightly above atmosphere.

The top of the chamber is provided with a duct 23 which is enlarged at 24 into a header which is connected through a duct 26 to the suction side of a fan 27. The discharge side of the fan is connected by means of a duct 28 to the interior of the chamber 11, as indicated at 29.

A steam line 31 and a water line 32 are provided which are brought together at 33 and extended into the duct 23 where they terminate, as indicated at 34, in any suitable type of spray or means of diffusing the steam. The spray is directed over a heating coil system, indicated by the numeral 36, for the purpose of superheating the steam. The coil 36 is provided with a steam inlet 37 and a steam outlet 38 through which high pressure and temperature steam may be circulated. The superheated steam is drawn into the fan, circulated through the duct 28 and directed into the chamber 11.

Any suitable means may be provided for securing substantially uniform distribution of the superheated steam so that the steam flows upward through the interstices in the conveyer in a substantially uniform manner from end to end. In the drawing I have shown a plenum or compartment 41 formed by a wall 42 into which the superheated steam discharges, as indicated at 29. The purpose is to build up a slight static pressure within the plenum 41, thus to secure a substantially uniform distribution of the superheated steam over the under surface of the wall 42 so that the superheated steam may issue through a plurality of openings 43 in the wall in a substantially uniform manner.

Due to the forced circulation caused by the fan, the superheated steam flows upward through the interstices of the conveyer and into intimate contact with the vegetables or other food products being pre-dried. Baffles 45 may be employed to further direct the steam. If desired, the plenum may be placed in the space between the upper and lower runs of the conveyer.

One of the important considerations in connection with the process of my invention is the maintenance of a large volume of superheated steam within the chamber 11, which preferably at a slight pressure, forces the air out of the chamber through the exit openings provided, as previously mentioned. I have found that air and other non-condensable gases tend to insulate the food products and prevent access of the steam thereto to thus decrease rapidity of drying. More important still is the fact that it is desirable in the pre-drying process of my invention to maintain as high a wet bulb temperature as possible. The higher the proportion of steam to air and other non-condensable gases, the higher the wet bulb temperature may be carried. I, therefore, contemplate supplying the steam in such quantity and at such a pressure that the chamber is substantially entirely filled with superheated steam and as much air and other non-condensable gases as possible are driven out of the chamber.

It will be appreciated that after the pre-dryer is in operation for a short time that substantially all the air will have been driven out of the chamber and little air will recirculate with the steam. Inward leakage of air is prevented due to the slight above atmospheric pressure which I contemplate maintaining in the chamber. Under these conditions maximum heat exchange may take place between the superheated steam and the food product being dried. It is also desirable to maintain a reasonably high velocity of circulation of the steam through the conveyer and around the product as the rate of removal of moisture from the food product is increased, other things being equal, with increased velocity of circulation. Thus I contemplate employing steam velocities of 300 to 500 feet per minute and in some cases it might be desirable to employ steam velocities as high as 1000 feet per minute. It is preferable to maintain the steam velocity as high as possible without blowing the product off the conveyer. It would also be possible to maintain in the chamber a less than atmospheric pressure condition. This would make desirable the prevention of the inward flow of air which is difficult in a continuous system of pre-drying due to the necessity of providing an inlet and an outlet for the product.

I have found that by subjecting the food product to superheated steam that the liquid or moisture on the surface of the food product will substantially immediately flash into steam. The higher the degree of superheat the more rapid the rate at which the surface moisture is removed or extracted from the food product. The degree of superheat should be sufficient to supply at least the major portion of the latent heat of vaporization of the water with which the steam comes in contact. Particularly when relatively high steam velocities are employed, it is possible that some of the water from the product may be carried along with the steam in liquid phase. With these possible factors in mind, the importance will be clear of reasonably rapid circulation of the superheated steam over the product so that "fresh" superheated steam will be continuously presented to the product.

It is important, however, that the process be carried out without case hardening the product. Case hardening occurs when the surface moisture is removed too rapidly or becomes too dry and results in preventing or decreasing the flow of moisture to the surface from the interior of the product. Experiments thus far conducted have indicated that with the steam at a slight pressure above atmosphere the dry bulb temperature of the steam (and non-condensable gases) should be in the neighborhood of 230° to 250° F. In some cases, however, to some extent depending upon the product being dried, it may be desirable to employ still higher steam dry bulb temperatures, possibly as high as 300° F. Thus, for example, I contemplate adding by the superheater coil 36 a sufficient degree of superheat to maintain the dry bulb temperature within the chamber 11 at the desired point. It will be appreciated that the preferred dry bulb temperatures mentioned are merely by way of example.

I have also found that the rate of flow of moisture from the center of a piece of vegetable, for example, is dependent upon the vapor pressure of the liquid or moisture within the vegetable. The higher the vapor pressure the more rapid the flow of moisture from the center of the vegetable to the surface. The vapor pressure of the moisture in the vegetable may be controlled by the wet bulb temperature of the steam or rather the mixture of steam, air, and other non-condensable gases. The higher the wet bulb temperature of the steam, or mixture of gases within the chamber, the more rapid the flow of moisture from the internal portions of the food product to the surface. The moisture upon reaching the surface is then picked up by or flashed into steam due to the superheated condition of the steam.

One of the important considerations is to so regulate the wet bulb temperature with respect to the dry bulb temperature that the moisture will flow from the internal portions of the food product being processed rapidly enough to prevent case hardening. I have found, for example, that with a dry bulb temperature of 240° F. the wet bulb temperature should preferably be in the neighborhood of 180° to 190° F. I have also successfully employed a dry bulb temperature of 250° F. and a wet bulb temperature of 192° F. A wet bulb temperature in excess of 192° F. is difficult to attain due to the recirculation, with the steam, of air and other non-condensable gases. In general, the wet bulb temperature should be as close as possible to the temperature of dry and saturated steam at the pressure corresponding to the pressure within the chamber.

Under the above conditions the surface moisture is taken up by the steam approximately at the same rate as the moisture flows to the surface, thus preventing or minimizing the case hardening of the food product. This is an important consideration for the reason that should the vegetable or other food product become case hardened the surface pores thereof will be substantially closed and it will be extremely difficult to extract further moisture therefrom in the dehydrator.

For the purpose of controlling the wet and dry bulb temperatures, I have provided suitable automatic controls which are diagrammatically shown in the drawing. If desired, however, manual control may be employed. A temperature responsive element 46, located on the discharge side of the fan, records and controls the temperature of the superheated steam on a recording and controlling instrument, indicated diagrammatically at 47. The recording and controlling instrument is of such type as to actuate a diaphragm type of valve, indicated diagrammatically at 48. The diaphragm valve line 37 accurately regulates the amount of steam flowing to the superheating coil which in turn regulates the degree of superheat in the steam flowing into the chamber 11 and the dry bulb temperature thereof.

The steam line 31 is provided with a control valve 49 and the water line is provided with a control valve 51. Conventional wet bulb temperature responsive elements, diagrammatically indicated at 50, 52, are subjected to the wet bulb temperature within the plenum 41 or may be subjected to the conditions existing at, for example, the point 53 in the chamber 11. In either event the wet bulb temperature responsive elements actuate controlling instruments 54 and 55 which in turn control and regulate in a manner well known in the art, respectively, the valves 49 and 51.

The steam and water lines 31 and 32 are, in addition, provided with hand control valves 50'. This permits either or both the steam or water line to be shut off. It will be appreciated that after the system is in operation for some time that the water evaporated from the vegetables may be sufficient to compensate for the losses of steam out of the system. In such case no water or steam need be supplied. However, should the wet bulb temperature drop too low either the water or steam line hand valve 50' may be opened to admit water or steam to the system and thereby increase the wet bulb temperature. On the suction side of the fan I have shown an opening 60 adapted to be closed by a slide 61. In most cases the system is operated with the slide closed but if desired the slide may be opened part or all the way to admit air to the system and thereby decrease the wet bulb temperature.

While I have mentioned rather specific wet and dry bulb temperatures, it will, of course, be appreciated that these temperatures are by way of example and are subject to variation, depending upon variable factors such as how much moisture it is desired to extract in the pre-drying step and, to a certain extent, on the volume of vegetables being processed and the moisture content thereof. The important consideration is to maintain the chamber substantially full of superheated steam with a minimum of air and non-condensable gases flowing at reasonably high velocities and to so regulate the wet and dry bulb temperature that the surface moisture is flashed into steam and the interior moisture of the vegetables or other food products flows to the surface sufficiently rapidly to insure rapid pre-drying and to prevent case hardening of the product.

With the conditions above described, I have found that in approximately two to three minutes the moisture content may be reduced to one-half or one-third of its original value and that the weight may be reduced by approximately one-half. The speed of the conveyer may be regulated in accordance with how much moisture removal is desired in the pre-drying step. In general, the speed of the conveyer may be such that the pre-drying time is, as above mentioned, from two to three minutes.

An important aspect of my invention is that the product after being pre-dried is preferably pressed, by any suitable machinery, to reduce its bulk before being passed to the dehydrator. This considerably reduces the expense of handling the product and materially increases the productive capacity of the dehydrator. While I have employed the expression "pre-dryer," the system of my invention may be accurately considered to include a predehydration or preliminary dehydration step, a pressing step, and a final dehydration step.

While I have described the preferred process of my invention and have shown and described an apparatus suitable for carrying out said process, it will be apparent that various modifications and changes which comes within the scope of the appended claim may be made therein, without departing from the spirit of my invention.

I claim:

In a process of food dehydration a partial drying step which is adapted to be carried out in a continuous manner within a chamber which comprises conveying the food product through the chamber in a continuous flow, creating a slight pressure above atmosphere within the chamber to prevent inflow of air into the chamber, continuously flowing superheated steam at high velocity and substantially free of non-condensable gases through a circuit which includes the chamber and over the surface of the product to vaporize at least the major portion of the moisture therefrom and as the circulation of superheated steam is continued drive the non-condensable gases out of the chamber, and controlling the supply of moisture and heat to the flowing steam in accordance with the wet and dry bulb temperatures existent within the circuit to cause the wet bulb temperature in the chamber to be as close as possible to the temperature of dry saturated steam at the pressure prevailing in the chamber and thereby cause the vapor pressure within the product to be at such a value that the moisture flows from the interior of the product to the surface substantially as fast as it is vaporized from the surface of the product.

DOUGLAS M. McBEAN.